United States Patent
Haynes et al.

(10) Patent No.: US 10,640,186 B2
(45) Date of Patent: May 5, 2020

(54) INFLATION DEVICE AND METHOD OF USE

(71) Applicant: GOODRICH CORPORATION, Charlotte, NC (US)

(72) Inventors: Timothy C Haynes, Prescott Valley, AZ (US); Drew Hartman, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 200 days.

(21) Appl. No.: 15/883,964

(22) Filed: Jan. 30, 2018

(65) Prior Publication Data

US 2019/0233173 A1    Aug. 1, 2019

(51) Int. Cl.
| | | |
|---|---|---|
| *B63C 9/23* | (2006.01) |
| *B65D 35/44* | (2006.01) |
| *B64D 25/14* | (2006.01) |
| *B63C 9/04* | (2006.01) |
| *B65D 47/06* | (2006.01) |
| *B64D 25/18* | (2006.01) |

(52) U.S. Cl.
CPC .................. *B63C 9/23* (2013.01); *B63C 9/04* (2013.01); *B64D 25/14* (2013.01); *B64D 25/18* (2013.01); *B65D 35/44* (2013.01); *B65D 47/06* (2013.01); *B63C 2009/042* (2013.01)

(58) Field of Classification Search
CPC ............. B63C 9/23; F04B 33/00; F04B 45/02
USPC ................................ 417/474, 476, 478, 480
See application file for complete search history.

(56) References Cited

U.S. PATENT DOCUMENTS

| 1,787,153 | A | * | 12/1930 | Huffman | ................. | F04B 45/02 |
| | | | | | | 417/437 |
| 2,423,890 | A | * | 7/1947 | Hurt | ..................... | A47C 27/081 |
| | | | | | | 446/226 |
| 2,686,006 | A | * | 8/1954 | Hasselquist | ............. | F04B 45/02 |
| | | | | | | 417/437 |
| 2,812,525 | A | * | 11/1957 | Friedlander | ............. | F04B 45/02 |
| | | | | | | 417/479 |
| 3,297,241 | A | * | 1/1967 | Andreasson | ......... | A47C 27/081 |
| | | | | | | 417/244 |
| 5,230,611 | A | * | 7/1993 | Shelton | ................... | F04B 45/02 |
| | | | | | | 417/437 |
| 2009/0249700 | A1 | | 10/2009 | Peterson et al. |
| 2013/0042414 | A1 | * | 2/2013 | Schreiber | ................. | A61G 7/05 |
| | | | | | | 5/714 |

FOREIGN PATENT DOCUMENTS

| FR | 3029091 A1 | 6/2016 |
| GB | 2429681 A | 3/2007 |
| WO | 2016073295 A1 | 5/2016 |

* cited by examiner

*Primary Examiner* — Timothy P. Kelly
(74) *Attorney, Agent, or Firm* — Snell & Wilmer, L.L.P.

(57) ABSTRACT

Systems and methods are disclosed herein for an inflation pouch. The inflation pouch may include a border on a first end and a nozzle on a second end, wherein the border defines an interior volume of the inflation pouch, and the interior volume is in fluid communication with the nozzle. The border further comprises a zipping fastener or a hook and loop fastener. The nozzle may couple with an inflation valve of an inflatable structure. The interior volume of the inflation pouch is in fluid communication with an interior volume of the inflatable structure.

12 Claims, 7 Drawing Sheets

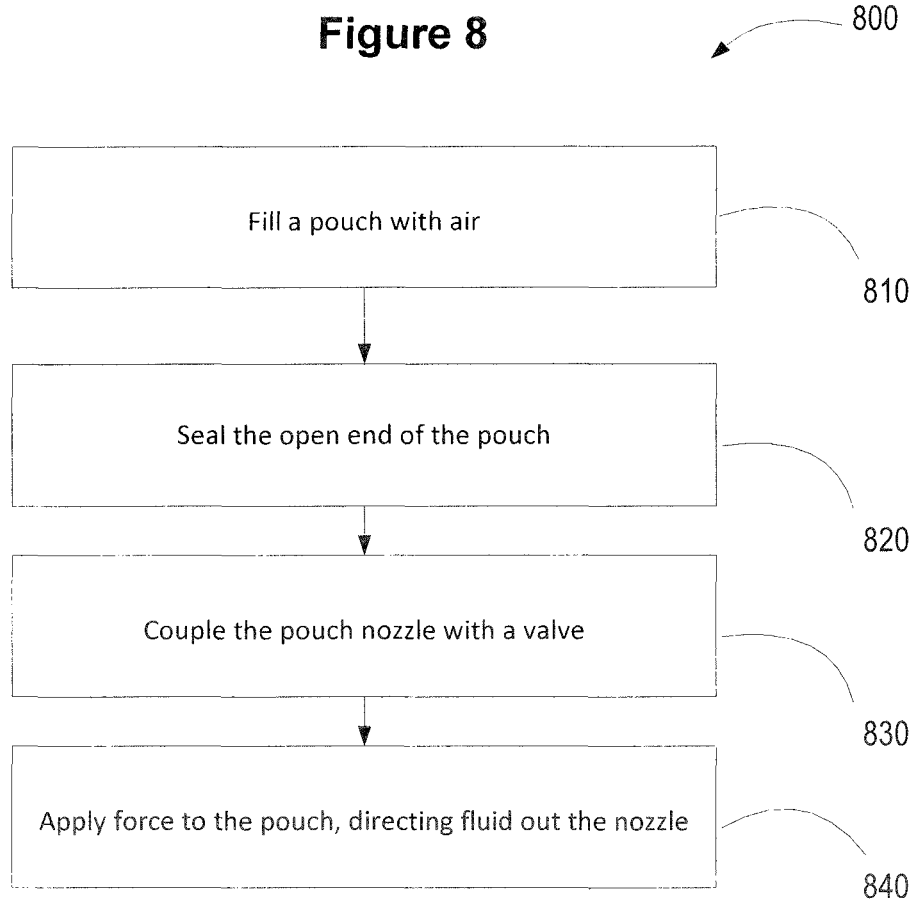

INFLATION DEVICE AND METHOD OF USE

FIELD

The present disclosure relates generally to aircraft evacuation assemblies, and more specifically to inflating life rafts and inflatable slides.

BACKGROUND

In the event of an emergency water landing, aircraft typically include inflatable structures that may be used as at least one of a slide to exit the aircraft or a flotation device (e.g. life raft) separate from the aircraft. To remedy inflatable slide and life raft punctures or tears, it is beneficial to have readily accessible to occupants of the inflatable slide or life raft a pump to manually inflate the inflatable slide or life raft and maintain the suitable operating pressure.

SUMMARY

According to various embodiments, an inflation pouch is described herein. The inflation pouch may include a border on a first end and a nozzle on a second end. The border may define an interior volume of the inflation pouch, and the interior volume may be in fluid communication with the nozzle. According to various embodiments, the border on the first end may include a zipping fastener. According to various embodiments, the border on the first end may include a hook and loop fastener. According to various embodiments, the nozzle may couple with an inflation valve of an inflatable structure. The inflatable structure may be one of a life raft or an inflatable slide. According to various embodiments, the interior volume of the inflation pouch may be in fluid communication with an interior volume of the inflatable structure. According to various embodiments, the border may include a first edge and a second edge. The first edge may be folded over the second edge to seal the first end closed. According to various embodiments, the inflation pouch may house at least one of a life raft survival kit or a life raft canopy.

According to various embodiments, an emergency pack is disclosed. The pack may include an inflation pouch with a border on a first end and a nozzle on a second end. The border may define an interior volume of the inflation pouch, and the interior volume may be in fluid communication with the nozzle. According to various embodiments, the pack may include a part housed within the inflation pouch. According to various embodiments, the part may include at least one of a life raft survival kit or a life raft canopy. According to various embodiments, the border of the first end may include a zipping fastener. According to various embodiments, the border of the first end may include a hook and loop fastener. According to various embodiments, the nozzle may couple with an inflation valve on an inflatable structure. The inflatable structure may be one of a life raft or an inflatable slide. According to various embodiments, the interior volume of the inflation pouch may be in fluid communication with an interior volume of the inflatable structure.

According to various embodiments, a method of inflating an inflatable structure is disclosed. The method may include directing a fluid into an opening of a first end of an inflation pouch. The opening may define an interior volume of the inflation pouch. According to various embodiments, the method may include coupling a nozzle on a second end of the inflation pouch with an inflation valve of the inflatable structure. The interior volume of the inflation pouch may be in fluid communication with an interior volume of the inflatable structure. According to various embodiments, the method may include applying force to the first end of the inflation pouch towards the nozzle. The force may direct the fluid through the nozzle to the interior volume of the inflatable structure. According to various embodiments, the applying the force may include rolling the first end of the inflation pouch towards the second end of the inflation pouch. According to various embodiments, the method may include sealing the opening of the first end of the inflation pouch after directing the fluid into the first end. The first end may include a border which defines the opening of the first end. According to various embodiments, the sealing may include folding a first edge of the border over a second edge of the border. According to various embodiments, the sealing may include closing a fastener located on the border. According to various embodiments, the fastener may include a hook and loop fastener. According to various embodiments, the fastener may include a zipping fastener.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 8 illustrates a flow diagram of a process for inflating a component using an inflation pouch in accordance with various embodiments.

Figure 1A:
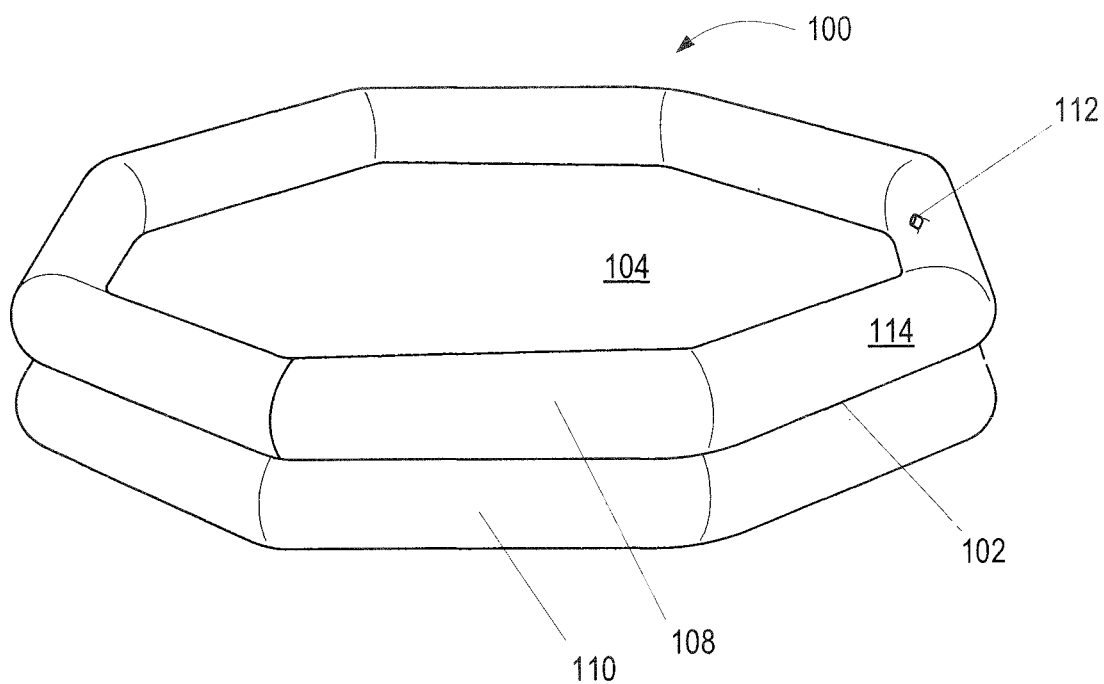
FIG. 1A illustrates an inflatable life raft comprising an inflation valve in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

In various embodiments, FIGS. 1 A-B illustrate different examples of inflatable structures. In various embodiments, and with reference to FIG. 1A, the inflatable structure may be life raft 100. The life raft 100 generally includes a base 102. The base 102 has a first side 104 and a second side 106 opposite the first side 104. In various embodiments, the first side 104 of the base 102 of the life raft 100 may be a top surface of the life raft 100 upon which passengers are supported in response to the life raft 100 being deployed in water. That is, the base 102 of the life raft 100 may be inflatable and may thus be configured to float on water. The life raft 100 may include one or more ladders that facilitate passenger embarking. The second side 106 of the base 102 of the life raft 100 may be a bottom surface of the life raft 100 that is intended to face the water. In various embodiments, the base 102 may include a first border tube 108 and a second border tube 110. The first and second border tubes 108, 110 may provide buoyancy to the life raft 100 and may be mounted opposite each other with respect to base 102. Said differently, using base 102 as a centerline axis, first border tube 108 is disposed above (positive Y-direction) base 102 with second border tube 110 disposed below (negative Y-direction) base 102 when second border tube 110 is disposed proximate a body of water. The first and second border tubes 108, 110 may provide a degree of buoyancy redundancy in that each border tube may be independently capable of supporting the weight of the life raft 100 when filled with passengers. The first border tube 108 may circumscribe the first side 104 of the base 102 and the second border tube 110 may circumscribe the second side 106 of the base 102. In various embodiments, base 102 may lie between first border tube 108 and second border tube 110. In various embodiments, the first border tube 108 may comprise inflation valve 112. Inflation valve 112 may comprise a spring loaded pocket valve and may seal automatically to prevent backflow when not in fluid communication with a second nozzle or valve. Fluid 214, such as ambient air, may enter an interior volume 114 of life raft 100 through inflation valve 112.

Figure 1B:
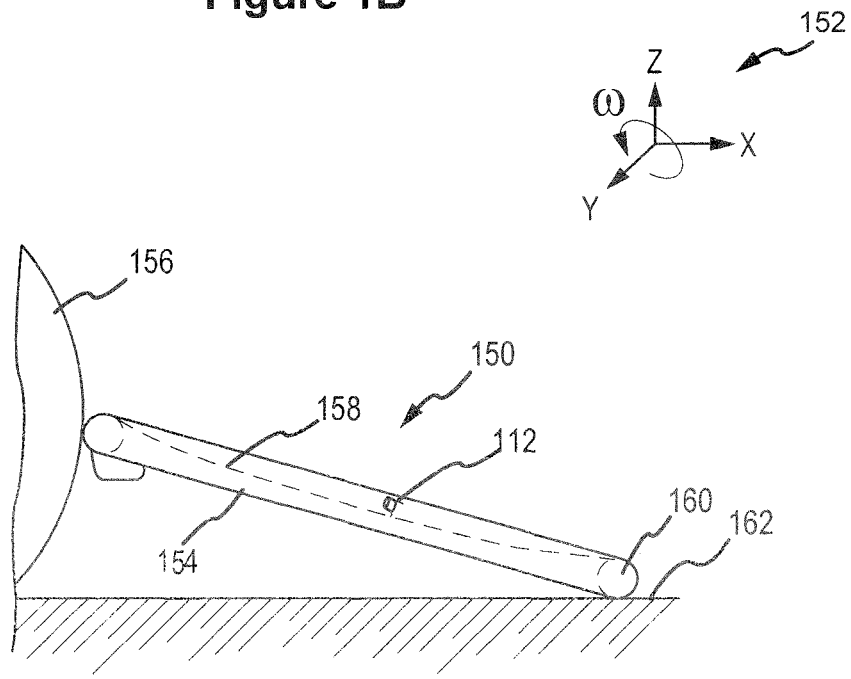
FIG. 1B illustrates an inflatable slide comprising an inflation valve in accordance with various embodiments.

In various embodiments, and with reference to FIG. 1B, the inflatable structure may be inflatable slide 150. Inflatable slide 150 may include a support structure 154. According to various embodiments, the inflatable slide 150 is inflatable (and is shown in an inflated state in the figures; i.e. extending downwards along the "z" axis of reference axis 152, and forwards in the direction). According to various embodiments, inflatable slide 150 is used for emergency evacuation. According to various embodiments, inflatable slide 150 is used for emergency evacuation of an aircraft 156 and is configured to pack within a compartment of the aircraft (i.e. the aircraft door, a slide bustle, etc.). According to various embodiments, inflatable slide 150 comprises a sliding surface 158, wherein the support structure 154 is in bordering engagement with the sliding surface 158. According to various embodiments, at least the support structure 154 of inflatable slide 150 is inflatable. According to various embodiments, sliding surface 158 comprises a flexible fabric material such as a urethane rip stop material and/or a nylon based cloth with a urethane coating. According to various embodiments, ground rail 160 may rest on ground surface 162. In various embodiments, the first border tube 108 may comprise inflation valve 112.

Figure 2:
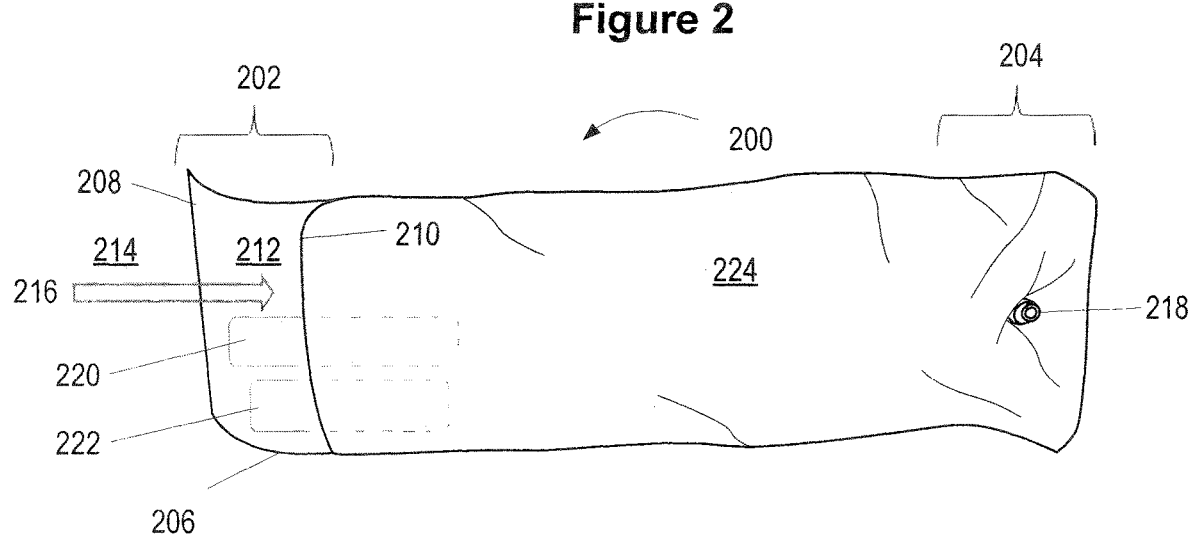
FIG. 2 illustrates an inflation pouch in accordance with various embodiments.

In various embodiments, and with reference to FIG. 2, inflation pouch 200 is provided. Inflation pouch 200 may comprise cotton, nylon, nylon coated with a thermoplastic material, and/or other suitable fibers, both natural, synthetic, and combinations thereof. In various embodiments, inflation pouch 200 may be an emergency pack configured to house components used in relation to emergency aircraft water landings, including a life raft canopy 222 or a survival kit 220. A survival kit 220 may comprise various medical supplies, fire starting instruments, and other devices or materials to sustain human life. The life raft canopy 222 may couple with the life raft 100 to protect passengers from the sun, rain, weather conditions, and other elements. In various embodiments, in use, the life raft canopy 222 may be coupled to the base 102 and may be configured to extend across the first side 104 of the base 102 to form a chamber (not shown) defined between the first side 104 of the base 102 and the life raft canopy 222.

In various embodiments, inflation pouch 200 comprises a first end 202 and a second end 204. The distance between first end 202 and second end 204 may be 10 inches (25.40 cm) to 48 inches (121.92 cm), 24 inches (60.96 cm) to 40 inches (101.60 cm), and about 36 inches (91.44 cm), where about in this context only means+/−1 inch (2.54 cm). Inflation pouch 200 may be 6 inches (15.24 cm) to 24 inches (60.96 cm), 10 inches (25.40 cm) to 18 inches (45.72 cm), and about 12 inches (30.48 cm) wide, where about in this context only means+/−1 inch (2.54 cm). First end 202 may comprise border 206, which may circumscribe the opening 212 of inflation pouch 200. Along border 206, first edge 208 and second edge 210 may be located across from each other. Border 206 may define opening 212 of inflation pouch 200 and an interior volume 224 of inflation pouch 200. Opening 212 is in fluid communication with interior volume 224. Fluid 214, such as ambient air, may enter opening 212 of inflation pouch 200 through path 216. Fluid 214 may comprise non-pressurized oxygen and/or non-pressurized air. In various embodiments, fluid 214 may enter opening 212 of inflation pouch 200 through path 216 by exposing opening 212 to a moving stream of fluid 214 (e.g. wind), by moving the opening 212 of inflation pouch 200 in a sweeping motion, or by any other mechanism of placing fluid 214 into opening 212 (e.g., orally blowing into opening 212). Fluid 214 may fill the interior volume 224 of inflation pouch 200, from the first end 202 to the second end 204.

Second end 204 of inflation pouch 200 comprises nozzle 218. Nozzle 218 is in fluid communication with interior volume 224 and opening 212 of inflation pouch 200. The nozzle 218 may comprise a fitting that has a flange in the nut on a first side facing the interior volume 224 of inflation pouch 200. On a second side of inflation pouch 20, nozzle 218 may comprise an adaptor to inflation valve 112, for example inflate deflate valves available from Mirada. Nozzle 218 may comprise a check valve or spring loaded pocket valve and may seal automatically to prevent backflow when not in fluid communication with a second nozzle or inflation valve 112. Nozzle 218 may couple with a mating valve in a second component, e.g. inflation valve 112. Nozzle 218 may be secured to second end 204 of inflation pouch 200 in a variety of ways. Nozzle 218 may comprise a press fit 0 ring to seal the juncture between nozzle 218 and inflation valve 112. In various embodiments, nozzle 218 may be sealed to inflation pouch 200. The seal between nozzle 218 and inflation pouch 200 may comprise a flange that is bonded to inflation pouch 200, or a plurality of rubber washers and a clench nut. In various embodiments, nozzle 218 may be sealed to inflation pouch 200 using a rubber flange that has threads on an interior portion of the flange.

Figure 3:
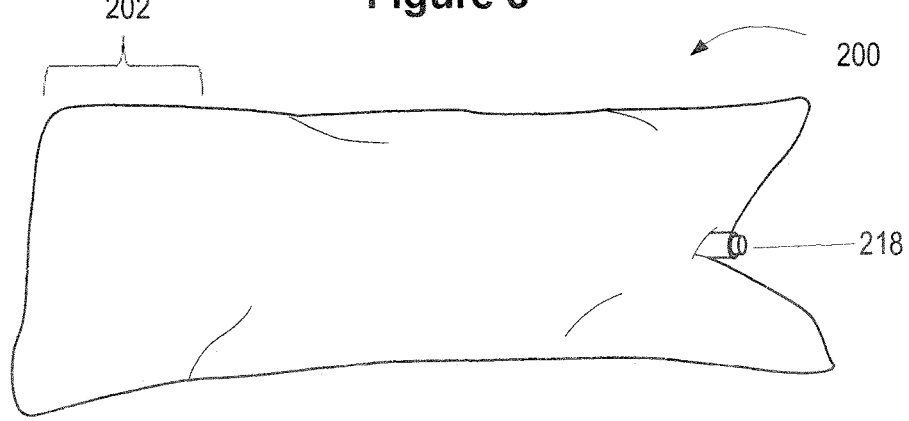
FIG. 3 illustrates a sealed inflation pouch in accordance with various embodiments.
Figure 4A:
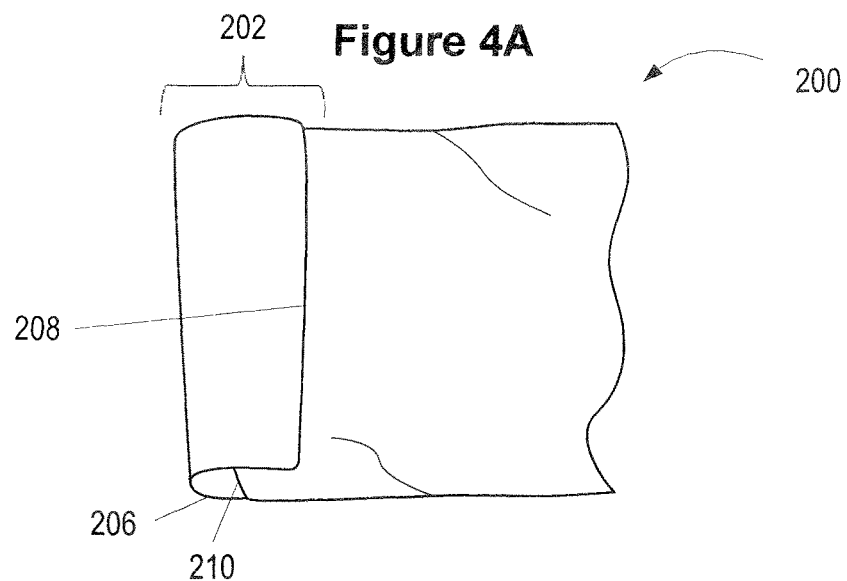
FIG. 4A illustrates an inflation pouch comprising a folded over edge in accordance with various embodiments.

Inflation pouch 200 may be emptied of the survival kit 220 or life raft canopy 222, and may be prepared to be used as a pump. In various embodiments, and with reference to FIG. 3, inflation pouch 200 is provided. In various embodiments, first end 202 is sealed shut, enclosing fluid 214 within the interior volume 224 of inflation pouch 200. In various embodiments, FIGS. 4 A-C show ways of securing the first end 202 closed. In various embodiments, and with reference to FIG. 4A, first edge 208 of border 206 may be folded over or rolled over second edge 210 to close opening 212 of first end 202 and prevent fluid from leaking out the opening 212.

Figure 4B:
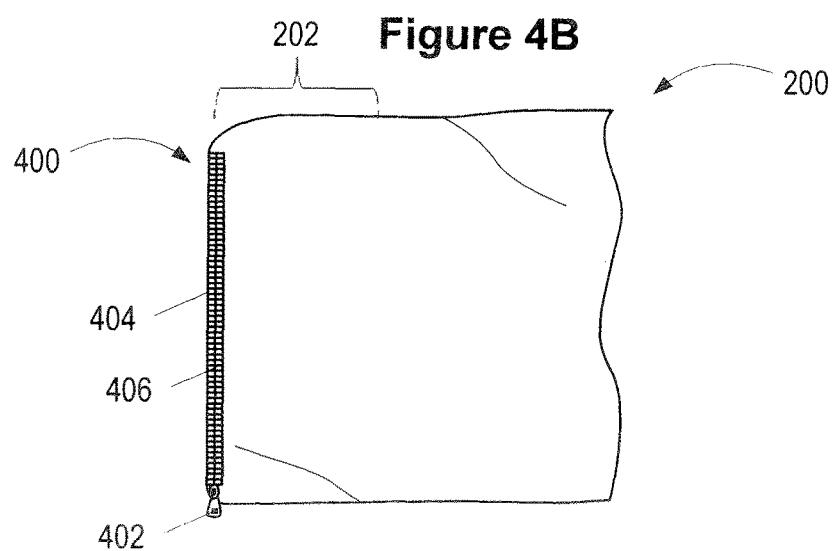
FIG. 4B illustrates an inflation pouch comprising a zipping fastener in accordance with various embodiments.

In various embodiments, and with reference to FIG. 4B, border 206 of first end 202 may comprise zipping fastener 400. Zipping fastener 400 may comprise zipper 402 and first edge zipping portion 404, which mates with second edge zipping portion 406. Zipper 402 may mate first edge zipping portion 404 and second edge zipping portion 406 to close opening 212 of inflation pouch 200. Zipping fastener 400 may be a tape zipper or may be hermetically sealed to prevent fluid 214 from leaking out the opening 212.

Figure 4C:
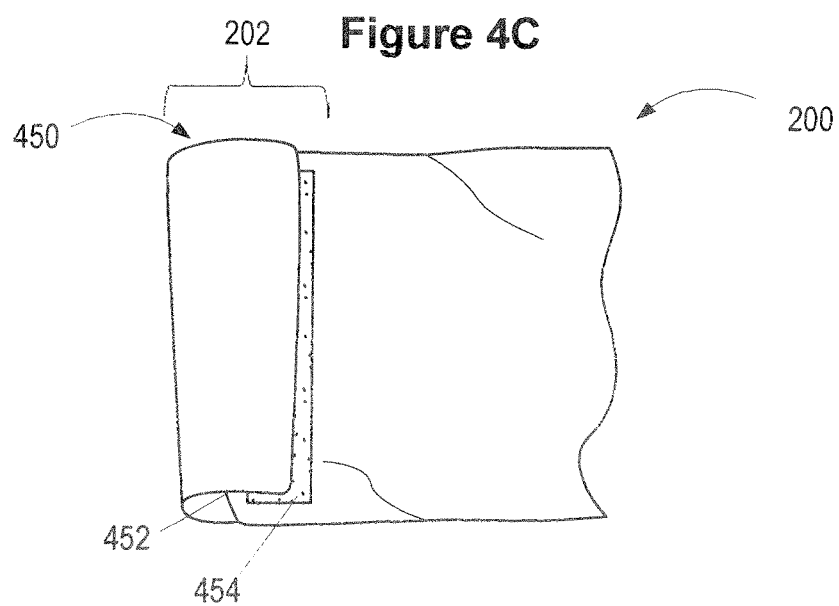
FIG. 4C illustrates an inflation pouch comprising a hook and loop fastener in accordance with various embodiments.

In various embodiments, and with reference to FIG. 4C, first end 202 may comprise hook and loop fastener 450. Hook and loop fastener 450 may comprise first edge hook and loop portion 452, which mates with second edge hook and loop portion 454 and seals opening 212 of inflation pouch 200. Hook and loop fastener 450 may be hermetically sealed to close first end 202 and prevent fluid 214 from leaking out of the opening 212.

Figure 5:
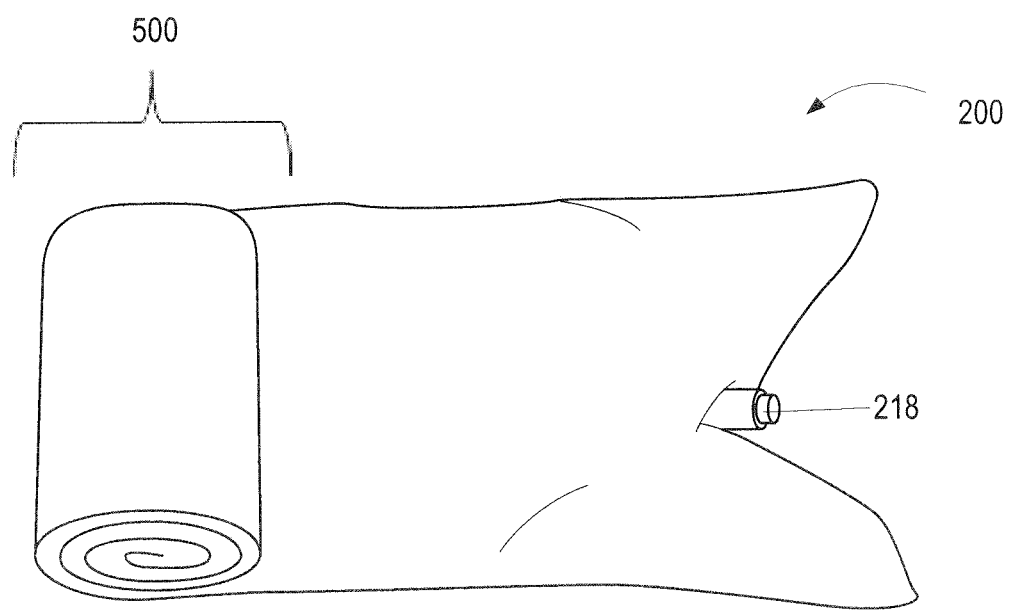
FIG. 5 illustrates force being applied to an inflation pouch in accordance with various embodiments.

In various embodiments, and with reference to FIG. 5, inflation pouch 200 is provided. Force may be applied to the first end 202 of inflation pouch 200 to direct fluid 214 towards nozzle 218. The force may be applied by rolling first end 202 radially about itself towards nozzle 218. This may pressurize fluid 214 within inflation pouch 200. Inflation pouch 200 may be rolled until the rolled portion 500 meets second end 204.

Figure 6:
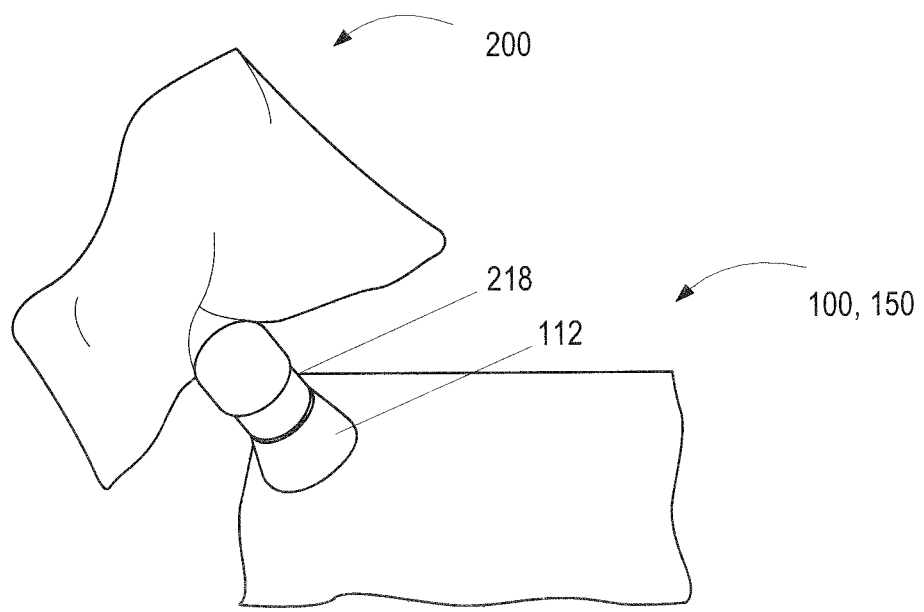
FIG. 6 illustrates an inflation pouch nozzle in accordance with various embodiments.

In various embodiments, and with reference to FIG. 6, the junction between nozzle 218 of inflation pouch 200 and valve 112 of life raft 100 or inflatable slide 150 is shown. In various embodiments, nozzle 218 may couple with valve 112 so that the interior portion of inflation pouch 212 is in fluid communication with the interior of life raft 100 or inflatable slide 150.

Figure 7A:
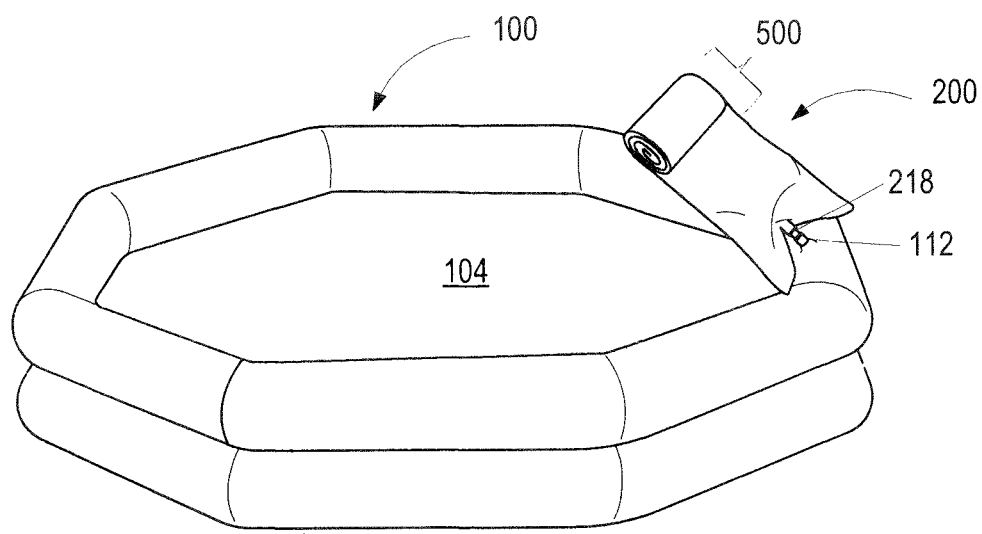
FIG. 7A illustrates an inflatable life raft being inflated with an inflation pouch in accordance with various embodiments.

In various embodiments, and with reference to FIG. 7A, life raft 100 is shown, with various elements omitted for clarity. Nozzle 218 is coupled with valve 112. First end 202 of inflation pouch is rolled radially about itself, pressurizing fluid 214, which may be directed through nozzle 218 into life raft 100. Inflation pouch 200 may be rolled until the rolled portion 500 meets second end 204, at which point nozzle 218 may be detached from valve 112. Inflation pouch 200 may be used to gather more fluid that can be used to inflate life raft 100 using the process described herein.

Figure 7B:
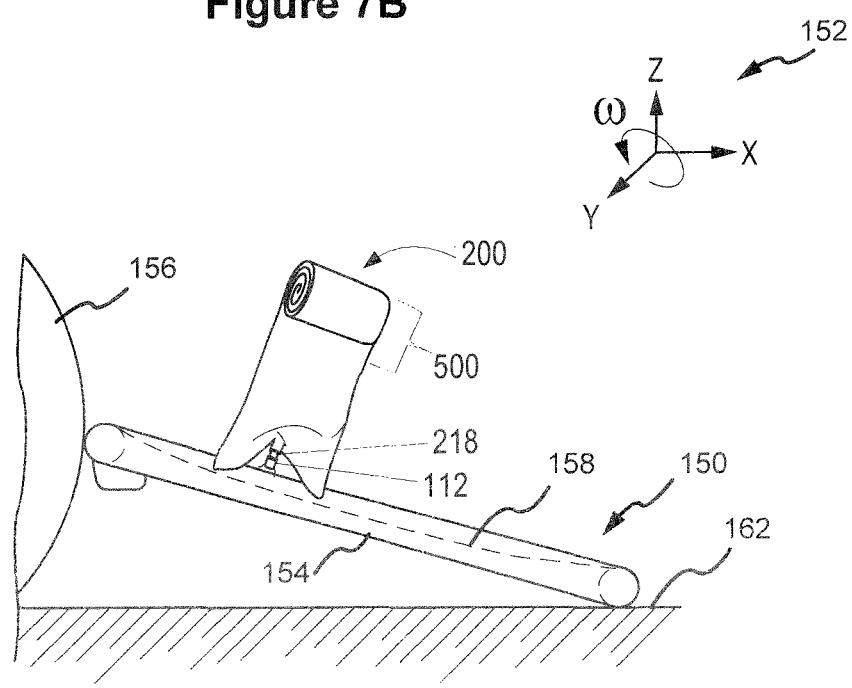
FIG. 7B illustrates an inflatable slide being inflated with an inflation pouch in accordance with various embodiments.

In various embodiments, and with reference to FIG. 7B, inflatable slide 150 is shown, with various elements omitted for clarity. Nozzle 218 is coupled with valve 112. First end 202 of inflation pouch is rolled radially about itself, pressurizing fluid 214, which may be directed through nozzle 218 into inflatable slide 150. Inflation pouch 200 may be rolled until the rolled portion 500 meets second end 204, at which point nozzle 218 may be detached from valve 112. Inflation pouch 200 may be used to gather more fluid that can be used to inflate inflatable slide 150 using the process described herein.

In various embodiments and with reference to FIG. 8, a flow diagram of a process 800 for inflating a component using an inflation pouch is illustrated. An opening of the first end of an inflation pouch may be filled with a fluid, for example, air (step 810). The fluid may enter the inflation pouch with assistance of a fan, the wind, manual blowing, or by moving the open end of the inflation pouch around in a sweeping motion. The first end of the inflation pouch may be sealed (step 820). The sealing the first end may prevent the fluid from escaping the opening of the first end. The end may be sealed my folding a first edge of the first end over the second edge. The first end may be sealed using a zipping fastener, a hook and loop fastener, or a tape adhesive. The nozzle of the inflation pouch may be coupled with a valve of an inflatable structure, for example a life raft or inflatable slide (step 830). Force may be applied to the first end of the inflation pouch to direct the fluid into the inflatable structure (step 840). The force may be applied by rolling the first end of the inflation pouch towards the nozzle.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An emergency pack comprising:
   an inflation pouch with a border on a first end and a nozzle on a second end, wherein the border defines an interior volume of the inflation pouch, and the interior volume is in fluid communication with the nozzle; and
   a part housed within the inflation pouch, wherein the part comprises a life raft survival kit including medical supplies and a fire starting instrument.

2. The pack of claim 1, wherein the border of the first end further comprises a zipping fastener.

3. The pack of claim 1, wherein the border of the first end further comprises a hook and loop fastener.

4. The pack of claim 1, wherein the nozzle couples with an inflation valve on an inflatable structure, wherein the inflatable structure is at least one of a life raft or an inflatable slide.

5. The pack of claim 4, wherein the interior volume of the inflation pouch is in fluid communication with an interior volume of the inflatable structure.

6. A method of inflating an inflatable structure, the method comprising:
   removing a life raft survival kit from an opening of a first end of an inflation pouch, the life raft survival kit including medical supplies and a fire starting instrument;
   directing a fluid into the opening of the first end of the inflation pouch, wherein the opening defines an interior volume of the inflation pouch;
   coupling a nozzle on a second end of the inflation pouch with an inflation valve of the inflatable structure, wherein the inflatable structure is at least one of a life raft or an inflatable slide of an aircraft evacuation system, wherein the interior volume of the inflation pouch is in fluid communication with an interior volume of the inflatable structure;
   applying force to the first end of the inflation pouch towards the nozzle, wherein the force directs the fluid through the nozzle to the interior volume of the inflatable structure; and
   inserting the life raft survival kit into the opening of the inflation pouch.

7. The method of claim 6, wherein the applying the force comprises rolling the first end of the inflation pouch towards the second end of the inflation pouch.

8. The method of claim 6, further comprising sealing the opening of the first end of the inflation pouch after directing the fluid into the first end, wherein the first end further comprises a border which defines the opening of the first end.

9. The method of claim 8, wherein the sealing comprises folding a first edge of the border over a second edge of the border.

10. The method of claim 8, wherein the sealing comprises closing a fastener located on the border.

11. The method of claim 10, wherein the fastener comprises a hook and loop fastener.

12. The method of claim 10, wherein the fastener comprises a zipping fastener.

* * * * *